March 13, 1956     W. N. WAGNON     2,738,427
WATER PURIFIER
Filed May 6, 1953
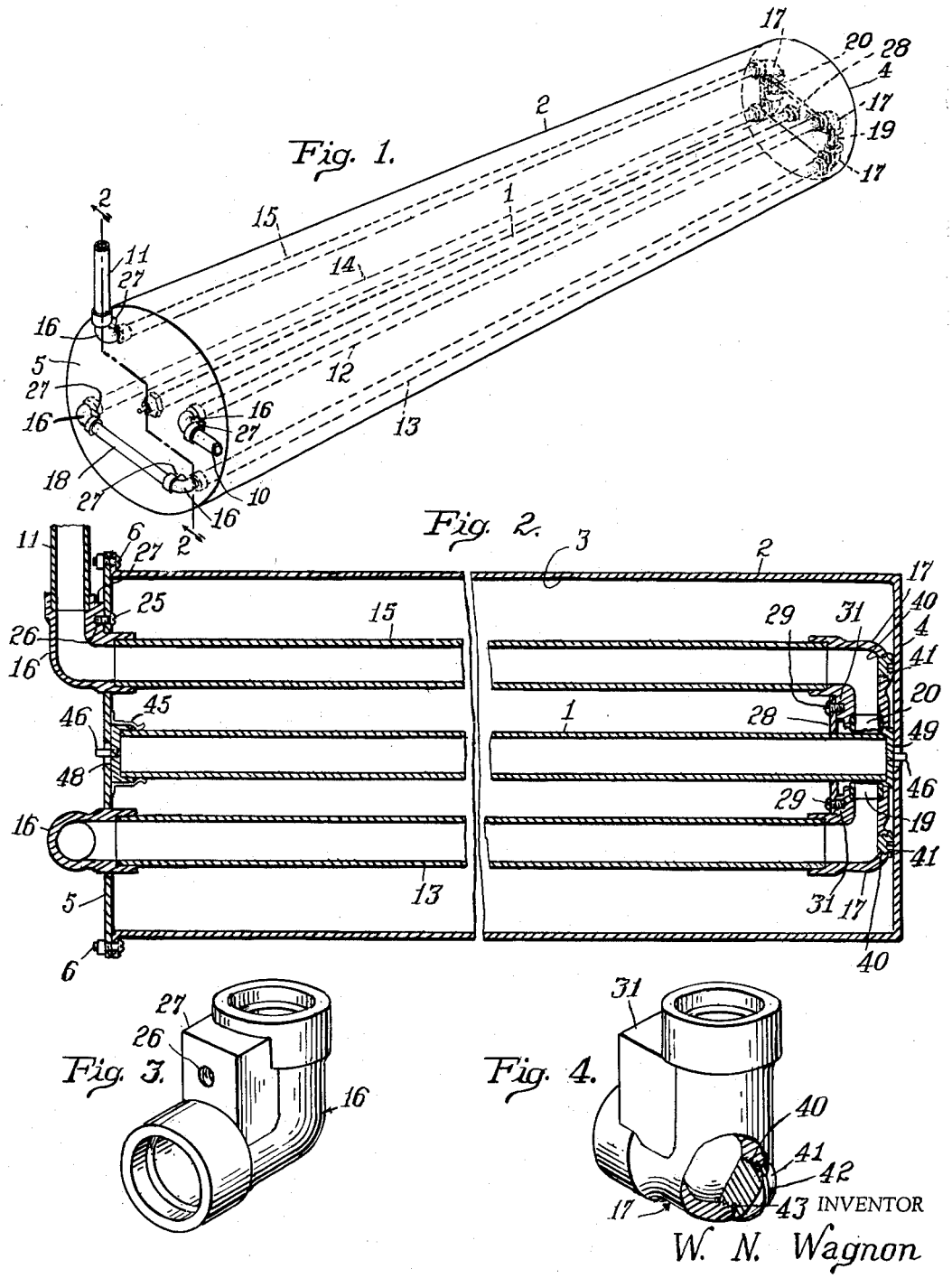
INVENTOR
W. N. Wagnon
ATTORNEY

United States Patent Office 2,738,427
Patented Mar. 13, 1956

2,738,427

WATER PURIFIER

William N. Wagnon, Odessa, Tex.

Application May 6, 1953, Serial No. 353,340

3 Claims. (Cl. 250—48)

This invention relates to a water purifier in which the bacteria content of the water is reduced by an ultra-violet ray treatment.

It is an object of this invention to provide a water purifier of the above type which is capable of effectively treating a large volume of water at a relatively small cost.

It is a more specific object of this invention to provide a water purifier capable of very efficient utilization of the ultra-violet rays emitted so as to increase the volume of water that may be handled by the apparatus in a given length of time.

It is a further object of this invention to provide novel fluid handling structure having means for permitting limited access to a fluid conduit for cleaning purposes.

The above and other objects are attained by the apparatus of this invention, one practical embodiment of which comprises a cylindrical casing having a highly reflective inner surface, an ultra-violet ray tube along the axis of the casing, and a water conduit having a plurality of transparent portions extending parallel to the tube. The conduit is provided with one or more plugs which may be removed from time to time to permit the removal of sediment from the interior of the transparent portions of the conduit.

Other objects and advantages of the apparatus of this invention will become apparent as the detailed description thereof proceeds in connection with the accompanying drawings, in which:

Fig. 1 is a perspective view of a water purifier according to this invention;

Fig. 2 is a vertical sectional view taken along line 2—2 in Fig. 1;

Fig. 3 is a perspective view of one type of elbow which may be used in the apparatus of this invention; and Fig. 4 is a perspective view of another type of elbow which may be used in the apparatus of this invention.

In the illustrated embodiment of this invention, an ultra-violet light bulb or tube 1 is located along the axis of a cylindrical casing 2 having a highly reflective inner surface 3. Polished aluminum has been found to be a satisfactory material from which the casing 2 may be formed, but it will be obvious that other materials may be used if desired. One end of the cylindrical casing 2 is closed by a closure member 4 which may be integral with the casing, and the other end is closed by an end plate 5 removably secured thereto by bolts 6.

The water conduit of the illustrated apparatus comprises a number of pipes or tubes connected together by elbows in such a manner as to direct the water to be treated along a path having a number of portions in proximity to the ultra-violet bulb 1. The pipe 10 conveys the water to be treated to the apparatus, and a pipe 11 conducts the treated water away from the apparatus. It is desirable that means, such as a valve or a pump, be provided for regulating the amount of water passing through the conduit in a unit of time. If this be done, the apparatus may operate at maximum efficiency at all times, the treatment period being varied in accordance with the bacteria content of the water to be treated.

The water pipes or tubes 12, 13, 14 and 15 are disposed about the ultra-violet bulb 1 and extend substantially parallel thereto. These tubes are made of a material such as quartz which is transparent to ultra-violet rays so that rays emitted by the bulb 1 or reflected by the surface 3 may pass through the water flowing in the tubes to kill the bacteria therein. The quartz tubes 12, 13, 14 and 15 are connected together and to the inlet and outlet pipes 10 and 11 by the elbows 16, the elbows 17 and the short pipes 18, 19 and 20 arranged as shown in Figs. 1 and 2.

The elbows 16 extend through holes in the end plate 5 and are removably secured thereto by screws 25 threadedly engaging the walls of the openings 26 in the block portions 27 of the elbows. The elbows 17 are secured to a light support plate 28 by screws 29 threadedly engaging the walls of openings, similar to openings 26, in the block portions 31 of the elbows.

Since the collection of sediment on the inside of the tubes 12, 13, 14 and 15 would deflect the rays and reduce the efficiency of the treatment, provision must be made to allow for periodic cleaning of these tubes. For this purpose, the elbows 17 may be of the type shown in Fig. 4.

The elbow illustrated in Fig. 4 is characterized by a threaded hole 40 in the back thereof and a threaded plug 41 removably closing the hole 40. A slot 42 in the face of the plug 41 permits manipulation of the plug by means of an ordinary screw driver, and an O-ring seal 43 provides a tight seal without undue pressure.

The other elbows 16 in the conduit of the purifier of this invention are preferably of the type shown in Fig. 3, which differs from the type shown in Fig. 4 only in that it has no hole corresponding to the hole 40. It is desirable that the exposed elbows 16 be of this type so as to prevent tampering with the water system by unauthorized persons. In this connection it should be noted that the plugged elbows 17 are located inside the casing 2 out of view and not readily accessible to passersby.

The ultra-violet bulb 1 passes through a hole in the light support plate 28 and is supported at its other end by a holder 45 attached to the end plate 5. The terminals 46 of the bulb 1 project through holes 48 and 49 in the end plate 5 and the closure member 4, respectively, for connection to a suitable electric circuit, not shown.

Although the above description is directed to the treatmen of water with ulra-violet rays, it will be apparent that the apparatus of this invention may also be adapted for the treatment of other fluids, and that other forms of radiation may be employed if desired.

Since various modifications of the structure described above by way of example will occur to others skilled in the art, the scope of this invention is to be determined by the claims which follow.

I claim:

1. Apparatus for treating a fluid comprising a cylindrical casing having a highly reflective inner surface, an ultra-violet ray bulb disposed along the axis of said casing, and a closed fluid conduit including a portion formed of a material which will permit the passage of ultra-violet rays therethrough, said portion of said conduit being disposed between said bulb and said casing so that the ultra-violet rays emitted by said bulb and reflected back and forth from the walls of said casing will pass through said portion of the fluid conduit to treat the fluid therein.

2. Apparatus for purifying water comprising a substantially closed cylindrical casing having a highly reflective inner surface, a straight ultra-violet ray bulb disposed along the axis of said casing, and a closed water conduit including a plurality of transparent portions in said casing disposed around said tube with each of said transparent portions extending substantially parallel to said bulb, whereby ultra-violet rays emitted by said bulb will be reflected back and forth from the walls of said casing and will pass through said portions of said water conduit to kill bacteria in the water flowing through said conduit.

3. Apparatus for purifying water comprising a cylindrical casing having a highly reflective inner surface, a closure member for one end of said casing, a removable closure member for the other end of said casing, a straight elongated ultra-violet ray bulb in said casing disposed along the axis thereof, a closed water conduit having a plurality of portions in said casing disposed around said bulb with each of said portions extending close and substantially parallel to said bulb and being formed of a material which is transparent to ultra-violet rays, and removable plug means for said conduit inside said casing to allow access to the interior of said conduit for removing sediment from said portions of said conduit.

References Cited in the file of this patent

UNITED STATES PATENTS

| | | |
|---|---|---|
| 1,752,332 | Fantz | Apr. 1, 1930 |
| 2,404,259 | Veitch | July 16, 1946 |
| 2,436,366 | Sconce et al. | Feb. 17, 1948 |
| 2,504,349 | Prieto | Apr. 18, 1950 |

FOREIGN PATENTS

| | | |
|---|---|---|
| 324,503 | Great Britain | Jan. 30, 1930 |